March 31, 1959     R. C. RIKE     2,879,867
BRAKE COOLING SYSTEM

Filed Jan. 23, 1956     2 Sheets-Sheet 2

INVENTOR.
RICHARD C. RIKE
BY Craig V. Montone
ATTORNEY

United States Patent Office 2,879,867
Patented Mar. 31, 1959

2,879,867
BRAKE COOLING SYSTEM

Richard C. Rike, Dayton, Ohio, assignor to General Motors Corporation, Detroit, Mich., a corporation of Delaware Application January 23, 1956, Serial No. 560,635

6 Claims. (Cl. 188—264)

This invention relates to a brake system adapted for use on a multiple wheel vehicle, and more particularly to a brake system for use on a motor vehicle. More specifically, the invention relates to a brake cooling system for the friction brakes of a motor vehicle adapted to have a liquid coolant circulated through the brakes for removing the heat of friction created during a brake application.

In a brake cooling system adapted to have a liquid coolant circulated through the brakes to remove the heat of friction during a brake application, a liquid pump is suitably driven by the vehicle or by a power element of the vehicle to effect a forced circulation through a conduit system for delivery of coolant to the several brakes of a motor vehicle for circulation through the brakes to effect heat removal from the braking elements. The liquid that is delivered to the several brakes of the vehicle is delivered to a heat exchange device for removal of the heat picked up in the brakes. The cooled liquid is then returned to the liquid circulating pumps so that liquid can again be circulated through the brakes to again pick up additional heat of friction from the braking elements.

In such a circulating system for coolant, there is provided a reservoir from which the liquid pump draws its supply of liquid for circulation to the brakes, the reservoir containing the excess quantity of liquid that is not immediately required for completely filling the brake circulating system. The reservoir is connected with the pumps for the circulating system by conventional conduits which do effect some resistance to flow of liquid, and to this extent tends to reduce the pumping capacity of the pumps for the liquid cooling system. Such resistance in the liquid lines between the reservoir and the circulating pumps may at times also result in cavitation in the pump which again reduces the flow capacity from the pump and therefore affects the efficiency of the brake cooling system.

It is therefore an object of this invention to provide for a forced liquid delivery of liquid coolant into the inlet suction lines for the pumps of the brake circulating system so as to effect a forced delivery of liquid into the pumps under pressure and thereby increase the pumping capacity of the coolant circulating pumps.

Since the liquid coolant is circulated under pressure through the circulating system by means of circulating pumps, the liquid will be returned to the reservoir from the heat exchange device under pressure. It is therefore another object of the invention to incorporate an injector in the reservoir by which liquid from the reservoir will be forcefully educted into the discharge line from the reservoir to the suction side of the pumps and thereby pressure charge the suction line of the pump to decrease the pressure differential across the pump with a resulting increase in displacement from the pump.

It is another object of the invention to provide an ejector in the reservoir for the coolant circulating system comprising an inlet conduit portion for the reservoir that is connected with the outlet side of the heat exchange device so that the liquid under pressure circulating in the system will enter the reservoir under full flow pressure established by the circulating pumps. The reservoir is also provided with a discharge conduit that is in spaced relation to the inlet conduit portion so that the high pressure fluid stream exhausting from the inlet conduit for the reservoir can be directed into the discharge conduit for the reservoir and thereby effect pressurization of the discharge conduit and concurrently effect eduction of liquid from the reservoir so as to deliver to the circulating pump a pressurized supply of coolant, and thereby increase the efficiency and capacity of the pump for circulating coolant through the circulating system.

Still another object of the invention is to provide in a reservoir of the type incorporating an ejector system as hereinbefore referred to means for separating a column of fluid in the reservoir from the main body of fluid that may be supplied to the hydraulic actuating system for the brakes relatively independently of the main body of fluid in the reservoir, the standing column of fluid adapted for supply to the hydraulic brake actuating system being a filtered supply obtained from the main body of fluid in the reservoir.

Further objects and advantages of the present invention will be apparent from the following description, reference being had to the accompanying drawings wherein a preferred form of the invention is clearly shown.

Figure 1:
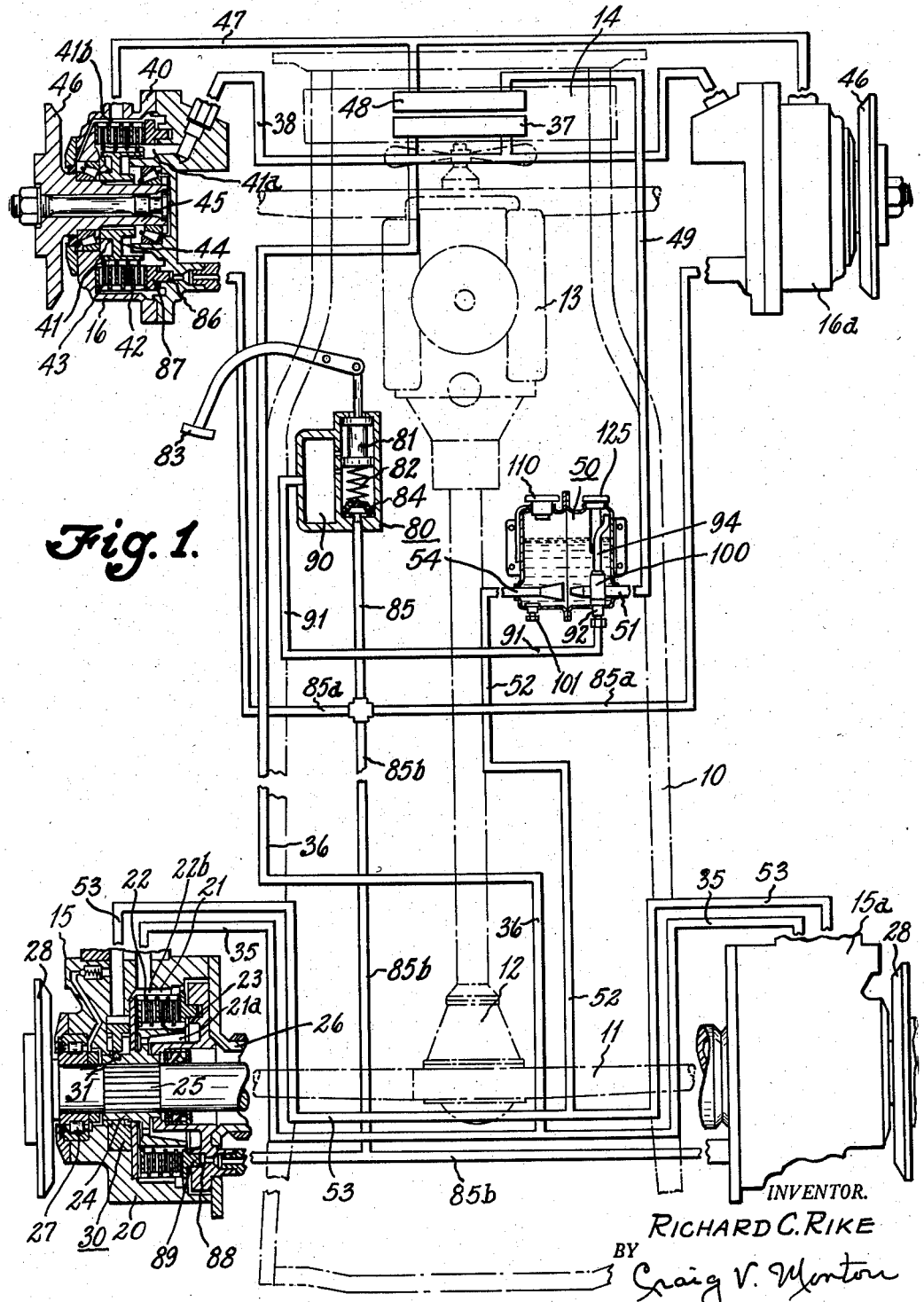
Figure 1 is a schematic illustration of a brake system incorporating features of this invention.

The brake system of this invention is applied to a motor vehicle that includes a frame 10 having a rear axle 11 connected through the differential 12 with the engine 13. The engine 13 is connected with a radiator 14 in conventional manner.

Wheel brakes 15 and 15a are adapted for connection with the rear axle 11 and with a rear wheel in conventional manner. Front brakes 16 and 16a are connected with front wheels in conventional manner and are adapted to be supported at opposite sides of the vehicle in the usual manner.

The rear brakes 15 and 15a are of similar construction so that only one of the brakes is described herein. More particularly, each of the brakes 15 and 15a comprise a brake housing 20 that encloses a brake chamber 21 containing a plurality of stationary brake disks 22 and rotating brake disks 23. The rotating brake disks 23 are carried upon a disk carrier 24 that is supported upon and drivingly connected to the axle 11 through the spline connection 25. The stationary brake disks 22 are similarly connected or splined with the brake housing 20 through a suitable connection whereby the disks 22 are maintained stationary relative to the rotating disks 23.

Brake housing 20 is supported upon the axle housing 26 in any suitable manner and the axle 11 is journaled in the brake housing 20 by means of a suitable anti-friction bearing member 27. The extending end of the axle 11 carries a wheel flange 28 adapted to demountably receive a conventional wheel.

A liquid pump 30 of any conventional vane type is provided within the brake housing 20 and is suitably keyed to the disk carrier 24 by means of the key connection 31 whereby to effect rotation of the pump 30 concurrently with rotation of the disk carrier 24 and thus with rotation with the rear axle 11. The pump 30 is thus driven whenever the axle 11 rotates, and thus whenever the motor vehicle is in motion.

The liquid pump 30 delivers coolant liquid under pressure into the interior chamber 21a of the brake chamber 21 for circulation between the friction disks 22 and 23 whereby to pick up heat of friction when the disks are in engaged position. The disks 22 or 23, one or the other or both, are provided with grooved faces whereby the liquid coolant can circulate from the inner brake chamber 21a into the outer brake chamber 22b under forced flow as caused by the pump 30.

Heated liquid is delivered from the outer brake chamber 22b into the conduit line 35 from which it flows through the conduit 36 into a heat exchange device 37 that is provided in the lower portion of the radiator 14 that serves the engine 13 whereby the heat of friction picked up by the liquid coolant from the brake 15 is removed and a cooled liquid coolant is then delivered into the conduit line 38 for delivery into the front wheel brakes 16 and 16a.

The front wheel brakes each include a brake housing 40 having a brake chamber 41 that contains a plurality of stationary brake disks 42 and a plurality of rotating brake disks 43. The stationary brake disks 42 are connected with the housing 40 whereby to retain them in a stationary condition, the housing 40 being suitably connected with the frame of the vehicle through a conventional suspension system. Rotating disks 43 are supported upon a brake disk carrier 44 that is splined to the spindle 45 and carries a wheel flange 46 for demountably supporting a front wheel in any conventional manner.

Liquid coolant delivered into the circulating line 38 is directed to the interior chamber 41a for circulation between the brake disks 42 and 43 in the same manner as liquid coolant is circulated between the brake disks 22 and 23 of the rear brakes 15. The coolant circulated between the brake disks 42 and 43 and delivered into the outer brake chamber 41b and from thence it is delivered into the circulating conduit line 47 for delivery to a second heat exchange device 48 located in the engine radiator 14 for removal of heat from the liquid coolant that was picked up in the front wheel brakes 15.

Liquid coolant delivered into the heat exchange device 48 is then delivered into the circulating line 49 for return to a fluid reservoir 50 by way of the inlet line portion 51. Coolant liquid is removed from the reservoir 50 through the suction line 52 that connects with the pumps 30 in the rear wheel brakes 15 and 15a through the conduit line 53, the conduit line 52 having a line portion 54 that connects with the reservoir 50.

From the foregoing description it will be apparent that liquid coolant is circulated by means of the pumps 30 in the rear wheel brakes 15 for delivery through a heat exchange device and then returned to the reservoir 50. The conduit line 52 and 53 offer some degree of restriction to the flow of liquid from the reservoir to the pumps 30 of the rear wheel brakes 15. Such restriction tends to reduce the capacity of the pumps 30 for delivery of fluid under pressure into the brake chambers 21 and for circulation through the coolant circulating system, a certain portion of the capacity of the pump being utilized to draw liquid from the reservoir 50 into the inlet side of the pump 30. If this restriction is high or should become high for any reason there even may result a cavitation in the pump which would seriously effect the volume of liquid delivered from the pump into the circulating system.

Figure 2:
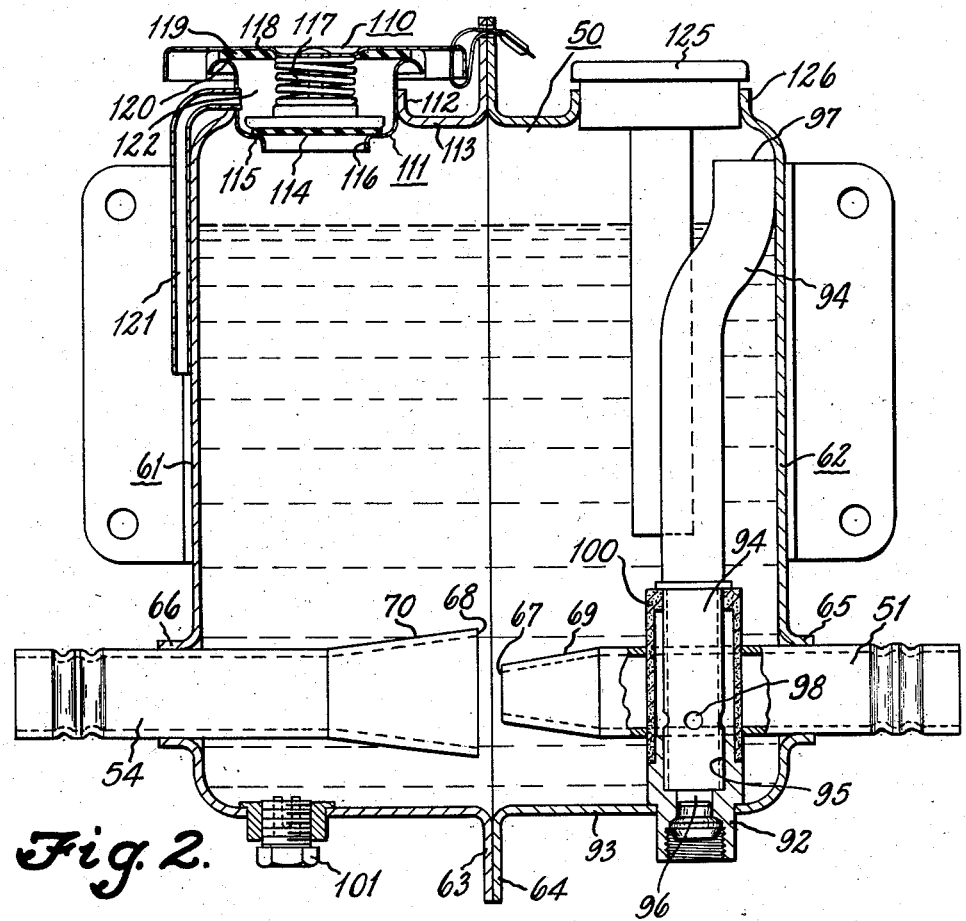
Figure 2 is a vertical cross sectional view of a fluid reservoir included in the brake circulating system.
Figure 3:
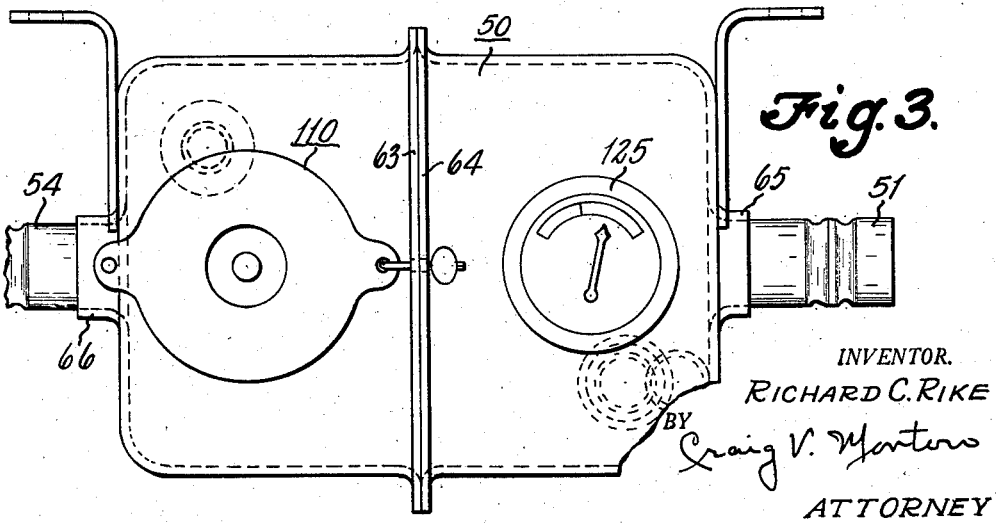
Figure 3 is a plan view of the reservoir illustrated in Figure 2.

As more particularly shown in Figures 2 and 3 the liquid reservoir 50 is constructed and arranged in a manner that the kinetic energy of the flow of liquid coolant entering the reservoir may be utilized to effect a pressure flow of liquid coolant from the reservoir into the suction inlet line 52 that connects with the pump 30 and thereby pressure charge the line 52 and the inlet side of the pump 30 to cause a positive pressure flow of liquid from the reservoir 50 into the pump which substantially increases the volume of liquid that may be circulated by the pump 30. Obviously, if the pressure differential between the inlet and outlet sides of the pump is reduced, the pumping capacity of the pump is increased since then the pump is merely required to circulate fluid under pressure rather than expend a part of its energy in negative force attempting to draw fluid from the reservoir 50.

As shown in Figures 2 and 3, the reservoir 50 is of a rectangular transverse cross section. The inlet line 51 into the reservoir 50 has the liquid flow therethrough under pressure as caused by a circulation of the fluid by the pump 30. As more particularly disclosed in Figures 2 and 3, the reservoir 50 comprises a container formed of two identical pressed sheet metal shells 61 and 62. The shells 61 and 62 have peripherally extending flange portions 63 and 64 respectively that are suitably bonded together to provide a closed container.

The shell 62 has a flanged opening 65 that receives the inlet portion 51 of the inlet conduit for the reservoir 50. The conduit portion 51 is suitably bonded to the flanged opening 65 to prevent loss of fluid from within the reservoir 50. The shell 61 has a corresponding flanged opening 66 that receives the discharge conduit portion 54 suitably bonded to the flanged portion 66 to prevent loss of fluid at this point. The inlet conduit portion 51 is disposed coaxial with the exhaust or discharge conduit portion 54 with the discharge end 67 of the inlet conduit portion 51 positioned in spaced relationship to the inlet end 68 of the discharge conduit portion 54.

As shown in Fig. 2, the discharge end 67 of the inlet conduit portion 51 has a reducing tapered portion 69 whereby the opening from the conduit portion 51 is of smaller cross section than the opening in the body portion of the inlet conduit 51. This construction results in a high pressure jet of liquid under pressure discharging from the inlet conduit portion 51 coaxial with the axis of the conduit 51.

The inlet end 68 of the exhaust or conduit portion 54 has a conically flared portion 70 to provide an inlet opening in the inlet end of the discharge conduit portion 54 of larger cross section than the opening of the body portion of the conduit. This conically flared portion 70 is coaxial with the tapered portion 69 of the conduit portion 51 whereby the high pressure jet stream of liquid exhausting from the conduit portion 51 enters the conically flared portion 70 on its axis, the construction and arrangement of the conduit portions 51 and 54 thereby providing an ejector or eductor by which liquid from the main body of the reservoir fluid is drawn into the discharge conduit portion 54 by action of the high pressure jet stream of liquid entering the inlet end 68 of the discharge conduit 54. The ejector action accomplishes the two-fold purpose of drawing liquid from the main body of fluid in the reservoir into the discharge conduit 54 and concurrently therewith placing the liquid in the discharge conduit portion 54 under pressure. The liquid under pressure in the conduit portion 54 transmits that pressure through the suction line 52 and 53 to the pump 30 whereby the inlet side of the pump 30 is pressurized with the resultant lower pressure drop across the pump so that its pumping capacity is automatically increased.

The body of liquid in the reservoir 50 is also adapted to provide a source of reserve hydraulic fluid for use in the hydraulic brake actuating system to replenish any loss of fluid from the brake actuating system.

The hydraulic brake actuating system comprises a master cylinder 80 that is suitably attached in a stationary position upon a stationary part of the vehicle. The master cylinder 80 contains a master cylinder piston 81 that is normally held in its retracted position by means of a compression spring 82. The master cylinder piston 81 is suitably connected with a brake pedal 83 to effect reciprocation of the piston 81 in the cylinder 80 and thereby displace hydraulic fluid through the residual pressure valve 84 into the hydraulic brake lines 85.

Connected with the hydraulic brake lines 85 are the brake lines 85a that connect with a hydraulic fluid chamber 86 in the front wheel brake 16 whereby to effect movement of the annularly disposed wheel piston 87 to effect compression of the disk stack 42—43 and thereby effect actuation of the brake.

The brake line 85 is also connected with a hydraulic brake line 85b that in turn is connected with an annular hydraulic fluid chamber 88 provided in the rear wheel 15 for actuating an annular wheel piston 89 to effect compression of the disk stack 22—23 of the rear wheel brake 15 and thereby effect actuation of the brake.

The master cylinder 80 has a fluid reservoir 90 that is connected by means of a conduit 91 with the main supply reservoir 50. It will be understood that the main supply reservoir 50 is disposed at a vertically higher level that the master cylinder 80 and its reservoir 90 whereby liquid can drain by gravity from the reservoir 50 into the reservoir 90 for the master cylinder to replenish fluid used by the hydraulic brake actuating system.

The conduit 91 is connected with the main fluid reservoir 50 by means of a fitting 92 suitably secured in the bottom wall 93 of the housing shell 62. The fitting 92 has a vertically disposed stand pipe 94 secured within the recess 95 of the fitting 92, the recess 95 being connected through an opening 96 with the conduit 91. The stand pipe 94 has an open upper end 97 that is disposed above the normal level of liquid in the reservoir 50 so that liquid will not flow into the stand pipe 94 through its open end under normal operating conditions.

At the lower end of the stand pipe 94 there is provided a plurality of openings 98 disposed well below the normal level of fluid in the reservoir 50 through which liquid can flow into the stand pipe 94 and cause the liquid level within the stand pipe 94 to rise to a common level with the liquid in the main body of liquid in the reservoir. Thus the stand pipe 94 provides a free column of liquid within the stand pipe that is separated from the main body of liquid in the reservoir that can be supplied substantially independently to the conduit 91 connected with the reservoir 90 of the master cylinder 80.

It is desirable that the liquid supplied to the reservoir 90 of the master cylinder 80 have all foreign particles removed from it. For this purpose, a porous filter 100 is provided around the lower portion of the stand pipe 94 and enclosing the inlet openings 98. Thus the l'quid that enters the opening 98 is filtered liquid so that the column of liquid standing within the stand pipe 94 is a filtered supply of liquid free of all dirt particles that can be supplied to the reservoir 90 of the master cylinder 80 at all times.

A drain plug 101 is provided in the shell 61 in a location similar to the location of the fitting 92 in the shell 62.

A filling cap 110 is received on a fitting 111 suitably secured in a flanged opening 112 provided in the upper wall 113 of the shell 61.

The filling cap 110 has a closure valve element 114 adapted to seat upon the bottom wall 115 of the fitting 111 whereby to close the opening 116 in the fitting 111 under pressure of a compression spring 117 that is provided between the valve element 114 and the closure cap wall 118. The closure cap wall 118 has a valve element or gasket 119 that seals upon the seat portion 120 of the fitting 111. The filling cap 110 thereby provides a pressure closure for the filling opening 116 to prevent loss of fluid from the reservoir 50. A vent pipe 121 communicates with a chamber 122 provided between the valve element 114 and the gasket 119.

With the filling opening 116 being closed by means of the valve element 114 and the compression spring 117, the coolant circulating system that includes the reservoir 50 is a pressurized system with the result that the pressure of the liquid coolant entering the reservoir 50 through the inlet conduit portion 51 may be discharged into the inlet throat 68 of the discharge conduit 54 without any substantial loss of its kinetic energy. The arrangement is one therefore that preserves or utilizes the effect of the kinetic energy of the fluid flowing through the coolant system to pressurize the inlet side of the pump and concurrently effect eduction of liquid from the reservoir 50 into the discharge conduit portion 54 to pressurize or supercharge the inlet side of the pump and thereby increase its pumping capacity.

A fluid level gauge 125 is secured in a flanged opening 126 provided in the reservoir shell 62.

While the form of embodiment of the invention as herein disclosed constitutes a preferred form, it is to be understood that other forms might be adopted as may come within the scope of the claims which follow.

What is claimed is as follows:

1. A brake system for a multiple wheel vehicle, comprising in combination, multiple wheels for a vehicle including friction brake means carried by the respective wheels, a hydraulic actuating system connected with said brake means to effect actuation thereof, said friction brake means being constructed and arranged for circulation of cooling liquid between the friction elements of the brake means when engaged to effect removal of heat of friction, liquid circulating pump means connected by conduit means with said brake means and with heat exchange means for pressure circulation of liquid between the brake means and the heat exchange means, a liquid reservoir having an inlet conduit connected with said heat exchange means through which fluid under pressure is delivered to said reservoir and having an outlet conduit connected with the inlet side of said pump through which fluid is delivered to said pump from said reservoir, said inlet and outlet conduits including portions disposed in spaced relationship forming thereby ejector means to effect forced eduction of fluid from said reservoir into said outlet conduit, and other conduit means connecting said reservoir with said hydraulic brake actuating system for supply of fluid thereto, said other conduit means having a portion thereof disposed in said reservoir to provide a column of fluid separated from and out of direct contact with the main body of circulating fluid in the reservoir and including a vent opening for supply of the fluid therefrom to the brake actuating system.

2. A brake system for a multiple wheel vehicle, comprising in combination, multiple wheels for a vehicle including friction brake means carried by the respective wheels, a hydraulic actuating system connected with said brake means to effect actuation thereof, said friction brake means being constructed and arranged for circulation of cooling liquid between the friction elements of the brake means when engaged to effect removal of heat of friction, liquid circulating pump means connected by conduit means with said brake means and with heat exchange means for pressure circulation of liquid between the brake means and the heat exchange means, a liquid reservoir having an inlet conduit connected with said heat exchange means through which fluid under pressure is delivered to said reservoir and having an outlet conduit connected with the inlet side of said pump through which fluid is delivered to said pump from said reservoir, said inlet and outlet conduits including portions disposed in spaced relationship forming thereby ejector means to effect forced eduction of fluid from said reservoir into said outlet conduit, and other conduit means connecting said reservoir with said hydraulic brake actuating system for supply of fluid thereto, said other conduit means having a portion thereof disposed in said reservoir to provide a column of fluid separated from the main body of fluid in the reservoir for supply to the brake actuating system, said conduit portion having a vent opening and an opening therein below the normal fluid level in said reservoir to provide for replenishing of fluid to said fluid column within said conduit portion.

3. A brake system for a multiple wheel vehicle, comprising in combination, multiple wheels for a vehicle including friction brake means carried by the respective wheels, a hydraulic actuating system connected with said brake means to effect actuation thereof, said friction brake means being constructed and arranged for circulation of cooling liquid between the friction elements of the brake means when engaged to effect removal of heat of friction, liquid circulating pump means connected by conduit means with said brake means and with heat exchange means for pressure circulation of liquid between the brake means and the heat exchange means, a liquid reservoir having an inlet conduit connected with said heat exchange means through which fluid under pressure is delivered to said reservoir and having an outlet conduit connected with the inlet side of said pump through which fluid is delivered to said pump from said reservoir, said inlet and outlet conduits including portions disposed in spaced relationship forming thereby ejector means to effect forced eduction of fluid from said reservoir into said outlet conduit, and other conduit means connecting said reservoir with said hydraulic brake actuating system for supply of fluid thereto, said other conduit means having a portion thereof disposed in said reservoir to provide a column of fluid separated from the main body of fluid in the reservoir for supply to the brake actuating system, said conduit portion having an open end disposed above the normal level of fluid in said reservoir whereby the column of fluid in said conduit portion is a free column, said conduit portion having an opening disposed below the normal fluid level in said reservoir through which liquid flows into said conduit portion from said reservoir whereby to maintain the fluid level in said conduit portion substantially the same as the fluid level in said reservoir.

4. A brake system for a muliple wheel vehicle, comprising in combination, multiple wheels for a vehicle including friction brake means carried by the respective wheels, a hydraulic actuating system connected with said brake means to effect actuation thereof, said friction brake means being constructed and arranged for circulation of cooling liquid between the friction elements of the brake means when engaged to effect removal of heat of friction, liquid circulating pump means connected by conduit means with said brake means and with heat exchange means for pressure circulation of liquid between the brake means and the heat exchange means, a liquid reservoir having an inlet conduit connected with said heat exchange means through which fluid under pressure is delivered to said reservoir and having an outlet conduit connected with the inlet side of said pump through which fluid is delivered to said pump from said reservoir, said inlet and outlet conduits including portions disposed in spaced relationship forming thereby ejector means to effect forced eduction of fluid from said reservoir into said outlet conduit, other conduit means connecting said reservoir with said hydraulic brake actuating system for supply of fluid thereto, said other conduit means having a portion thereof disposed in said reservoir to provide a column of fluid separated from the main body of fluid in the reservoir for supply to the brake actuating system, said conduit portion having an open end disposed above the normal level of fluid in said reservoir whereby the column of fluid in said conduit portion is a free column, said conduit portion having an opening disposed below the normal fluid level in said reservoir through which liquid flows into said conduit portion from said reservoir whereby to maintain the fluid level in said conduit portion substantially the same as the fluid level in said reservoir, and filter means disposed around said last mentioned opening to effect filtration of liquid entering said conduit portion from said reservoir.

5. A brake system for a multiple wheel vehicle, comprising in combination, multiple wheels for a vehicle including friction brake means carried by the respective wheels, a hydraulic actuating system connected with said brake means to effect actuation thereof, said friction brake means being constructed and arranged for circulation of cooling liquid between the friction elements of the brake means when engaged to effect removal of heat of friction, liquid circulating pump means connected by conduit means with said brake means and with heat exchange means for pressure circulation of liquid between the brake means and the heat exchange means, a liquid reservoir having an inlet conduit connected with said heat exchange means through which fluid under pressure is delivered to said reservoir and having an outlet conduit connected with the inlet side of said pump through which fluid is delivered to said pump from said reservoir, and other conduit means connecting said reservoir with said hydraulic brake actuating system for supply of fluid thereto, said other conduit means having a portion thereof disposed in said reservoir to provide a column of fluid separated from and out of direct contact with the main body of circulating fluid in the reservoir and including a vent opening and an opening therein for supply of the fluid therefrom to the brake actuating system.

6. A brake system for a multiple wheel vehicle, comprising in combination, multiple wheels for a vehicle including friction brake means carried by the respective wheels, a hydraulic actuating system connected with said brake means to effect actuation thereof, said friction brake means being constructed and arranged for circulation of cooling liquid between the friction elements of the brake means when engaged to effect removal of heat of friction, liquid circulating pump means connected by conduit means with said brake means and with heat exchange means for pressure circulation of liquid between the brake means and the heat exchange means, a liquid reservoir having an inlet conduit connected with said heat exchange means through which fluid under pressure is delivered to said reservoir and having an outlet conduit connected with the inlet side of said pump through which fluid is delivered to said pump from said reservoir, and other conduit means connecting said reservoir with said hydraulic brake actuating system for supply of fluid thereto, said other conduit means having a portion thereof disposed in said reservoir to provide a column of fluid separated from the main body of fluid in the reservoir for supply to the brake actuating system, said conduit portion having an open end disposed above the normal level of fluid in said reservoir whereby the column of fluid in said conduit portion is a free column said conduit portion having an opening disposed below the normal fluid level in said reservoir through which liquid flows into said conduit portion from said reservoir whereby to maintain the fluid level in said conduit portion substantially the same as the fluid level in said reservoir.

References Cited in the file of this patent

UNITED STATES PATENTS

| | | |
|---|---|---|
| 2,187,646 | Darrieus | Jan. 16, 1940 |
| 2,195,130 | Hoyt | Mar. 26, 1940 |
| 2,304,096 | Hulman et al. | Dec. 8, 1942 |
| 2,443,518 | Rushmore | June 15, 1948 |
| 2,633,081 | Ruth | Mar. 31, 1953 |
| 2,788,870 | Heck | Apr. 16, 1957 |